United States Patent [19]

Takao

[11] Patent Number: 4,612,871

[45] Date of Patent: Sep. 23, 1986

[54] DEVICE FOR VISUALLY SETTING THE SPRING FORCE OF A SEAT SUSPENSION FOR A VEHICLE

[75] Inventor: Sakamoto Takao, Tokyo, Japan

[73] Assignee: Tachikawa Spring Co., Ltd., Tokyo, Japan

[21] Appl. No.: 688,297

[22] Filed: Jan. 2, 1985

[51] Int. Cl.[4] .............................................. F21Q 3/00
[52] U.S. Cl. ................................. 116/202; 116/28 R;
177/DIG. 6; 248/542; 296/65 R
[58] Field of Search ............. 116/28 R, 202, DIG. 32;
362/75, 131; 350/606, 113, 110; 356/375, 399,
401; 33/286, 288; 340/686; 177/178, 177, DIG.
6; 296/65 R; 248/542

[56] References Cited

U.S. PATENT DOCUMENTS

| | | | |
|---|---|---|---|
| 1,388,292 | 8/1921 | Noisom | 350/113 |
| 2,390,665 | 12/1945 | Putt | 362/131 |
| 3,106,127 | 10/1963 | Koller | 350/113 |
| 3,489,233 | 1/1970 | Schwarz | 177/178 |
| 3,664,746 | 5/1972 | McKnight | 356/138 |
| 3,950,072 | 4/1976 | Aten | 350/110 |
| 4,405,204 | 9/1983 | Saint-Sevin et al. | 350/174 |

FOREIGN PATENT DOCUMENTS 211505 12/1982 Japan ................................. 356/375

Primary Examiner—Charles Frankfort
Assistant Examiner—W. Morris Worth
Attorney, Agent, or Firm—Darby & Darby

[57] ABSTRACT

A device for visually setting the spring force of a seat suspension for use in an automotive seat according to the weight of an occupant of the seat includes a display section formed of a light reflecting body and disposed on an inside lining of an automotive door for indicating the proper height of the automotive seat, and a visually confirming function section disposed in the seat for enabling the seat occupant to visually confirm the above-mentioned display section when the height of the seat is set at a predetermined level by adjustment of the spring force of the seat suspension. When the spring force of the seat suspension is properly set and thus the height of the seat is set at a predetermined level, the visually confirming function section enables the occupant while remaining seated to visually confirm the display section located in the door lining at a position where the occupant can easily observe it.

3 Claims, 3 Drawing Figures

DEVICE FOR VISUALLY SETTING THE SPRING FORCE OF A SEAT SUSPENSION FOR A VEHICLE

BACKGROUND OF THE INVENTION

1. Field of the Invention

The present invention relates to a device which confirms whether the spring force of a seat suspension of a seat for use in an automobile is set properly in compliance with the weight of the occupant of the seat.

2. Description of the Prior Art

In general, a seat suspension of a seat for use in an automobile is structured to be adjustable in its spring force in accordance with the weight of the occupant of the seat, so that the automotive seat can be set in a predetermined height by means of such spring force adjustment.

Conventionally, there have been proposed various devices for confirmation of the proper setting of the spring force of such automotive seat suspension.

Such prior art devices include, for example, a display tape with a weight scale adhered to the side of the seat suspension; a device having a weight scale attached to an operation handle for adjusting the spring force; and, a chain hung down onto the lower surface of the sitting portions of the seat so as to determine the distance between the lower surface of the seat sitting portions and the floor surface of a vehicle body, that is, the height of the seat corresponding to the spring force of the seat suspension.

The above-mentioned prior art devices, however, are found disadvantageous in that the above-mentioned weight scales and the chain for determining the seat height are located respectively at such positions for the occupant to view them easily, that is, it is difficult for the occupant to visually confirm them while he or she is normally seated, so that the occupant must take an unreasonably forced attitude to confirm through them the settings of the seat suspension spring force. Therefore, when confirming the spring force setting, a predetermined load can not be applied to the seat, which may result in inaccurate settings for the spring force of the seat suspension.

SUMMARY OF THE INVENTION

The present invention thus aims to eliminating the technical problems found in the above-mentioned prior art devices.

Accordingly, it is a primary object of the invention to provide an improved confirmation device having display means to display the heights of an automotive seat which is provided at such a position that an occupant of the seat can view it visually and easily and thus which enables the occupant, while sitting normally, to easily confirm through the displacements of the seat height whether the spring force of the seat suspension has been set properly.

In accomplishing this object, the invention comprises a display section of a light reflecting member located in a door inside lining for displaying an appropriate height of the seat, and a visual-confirmation function section which enables the occupant to visually confirm the display section when the seat height is set at a predetermined level by means of adjustment of the spring force of the seat suspension.

In the present invention, if the spring force of the seat suspension is properly set and thus the height of the seat is set at a predetermined level, then the visual-confirmation function section enables the occupant taking a sitting attitude to visually confirm the display section in the door inside lining which is located at a position for the occupant to easily view.

According to the construction of the invention, the occupant, while remains seated, is able to easily confirm whether the spring force of the seat suspension has been properly set according to the weight of the occupant through the displacements of the seat heights corresponding to the spring force settings, and thus can achieve an accurate setting for the above-mentioned spring force.

The above and other related objects of the invention will be more apparent from a reading of the following description of the disclosure found in the accompanying drawings and the novelty thereof ponted in the appended claims.

DETAILED DESCRIPTION OF PREFERRED EMBODIMENTS OF THE INVENTION

Figure 1:
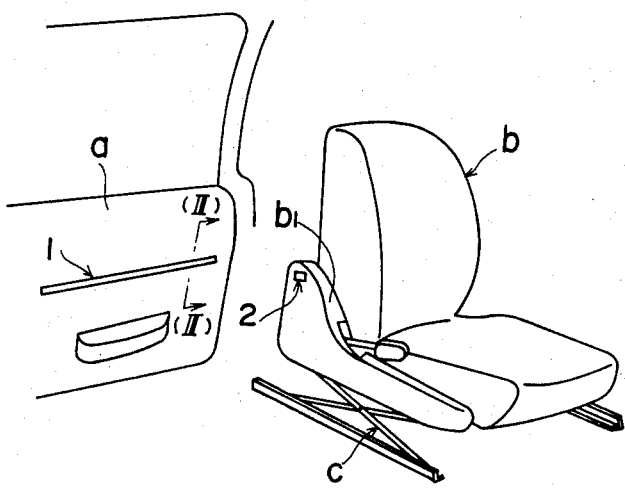
FIG. 1 is a perspective lay-out view of an embodiment of the invention.

A first embodiment of an automotive seat suspension spring force setting confirmation device constructed in accordance with the invention, as shown in FIG. 1, comprises a display section (1) provided in the inside lining (a) of an automotive door and a visual-confirmation function section (2) located in an automotive seat (b).

The display section (1) is used to display a proper seat height. It is formed of a light reflecting member in a strip shape to cover the range of sliding of the seat (b), adhered to the door inside lining (a), and has a reflecting surface (1a) with suitable angles from 45 deg. to 60 deg. so as to reflect light upwardly, that is toward the occupant.

Figure 2:
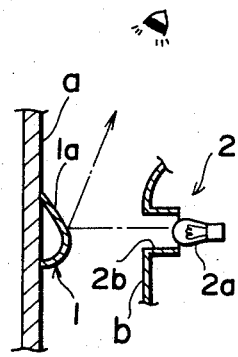
FIG. 2 is an enlarged sectional view taken along line (II)—(II) in FIG. 1.

The visual-confirmation function section (2) is used to enable the occupant to visually confirm the above-mentioned display section (1). As shown in FIG. 2, it includes a lamp (2a) within either a seat lower cover (b1) incorporating a reclining mechanism or a seat cushion (not shown), and is so constructed that the lamp (2a) is faced toward the door lining (a) by means of a window hole (2b). This lamp (2a) can be turned on by a switch when the spring force of a seat suspension (c) is to be adjusted.

In the above-mentioned spring force setting confirmation device, or the first embodiment of the invention, if the spring force of the seat suspension (c) is set for a proper value by means of adjustment of the spring force and the seat height is thus set at a predetermined level, then the lamp (2a) of the visual-confirmation function section (2) faces the display section (1) and the reflecting surface (1a) of the display section (1) reflects the light of the lamp (2a); the reflected light enables the occupant to visually confirm the display section (1) and thus to confirm that a proper setting for the spring force of the seat suspension has been made.

Figure 3:
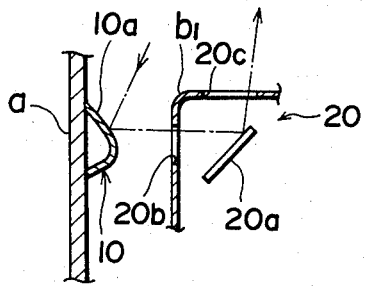
FIG. 3 is a longitudinal section view of another embodiment of the invention.

Next, we will describe another embodiment of invention shown in FIG. 3.

This embodiment includes a display section (10) colored in highly visually confirmable color such as red or yellow, and a visual-confirmation function section (20) which comprises a reflecting mirror (20a) provided within a seat lower cover (b1) of transparent material with an angle of approx. 45 deg., a window hole (20b) for admitting light onto the reflecting mirror (20a), and a window hole (20c) for visually confirming the reflected light from the reflecting mirror (20a), the latter window hole (20c) being provided at such a position for the occupant to be able to visually observe it.

Accordingly, in this embodiment, when the spring force of the seat suspension (c) has been properly set and thus the height of the seat has been set at a predetermined level, then the natural light that has struck on the reflecting surface (10a) of the display section (10) is allowed to pass into the visual-confirmation function section (20) via the above-mentioned light admitting window hole (20b) and is then reflected upwardly by the reflecting mirror (20a) of the same function section (20), so that the coloring of the display section (10) can be visually confirmed by the seat occupant through the visually confirming window hole (20i c).

What is claimed is:

1. A device for visually setting the spring force of a seat suspension for use in a seat of a vehicle, said device comprising:

a light reflective means provided on an inner wall of a door of said vehicle, said light reflective means being disposed thereon at a position whereby the spring force of said seat suspension can be adjusted properly in relation to the weight of an occupant seated on said seat; and optical means for establishing optical communication with said light reflective means, said optical means being provided at a lateral side of said seat, said optical means being positioned at a height corresponding to the position of said light reflective means for proper adjustment of the spring force of said seat suspension, wherein a light is visualized by said occupant on said light reflective means from said optical means, thereby allowing said occupant to visually ascertain that the spring force of said seat suspension is adjusted properly in relation to the weight of the occupant.

2. The device in accordance with claim 1, wherein said optical means comprises a seat lower cover, a lamp provided in said seat lower cover so as to emit a light in a direction toward said inner wall of said door, and a window hole formed in said seat lower cover such that it is disposed concentrically of said lamp so as to permit the light of said lamp to pass through said window hole, whereby said light of said lamp passes through said window hole and is reflected by said light reflective means in a direction wherein said occupant can see the reflected light.

3. The device in accordance with claim 1, wherein said optical means comprises seat lower cover, a light admitting window hole formed in said seat lower cover and disposed to face said inner wall of said door, a reflecting mirror disposed interiorly of said seat lower cover, and a reflected-light emitting window hole formed in said seat lower cover and positioned therein to be readily visible by said occupant, whereby ambient light reflected by said light reflective means is admitted into said light admitting window hole, then reflected by said reflecting mirror in a direction toward said reflected-light admitting window hole, so that said occupant can see the reflected ambient light when the spring force has been properly set.

* * * * *